US010640253B2

(12) United States Patent
Duncan

(10) Patent No.: US 10,640,253 B2
(45) Date of Patent: May 5, 2020

(54) TUBULAR BANDING APPLICATOR AND METHOD

(71) Applicant: Axon LLC, Apex, NC (US)

(72) Inventor: Adam W. Duncan, Apex, NC (US)

(73) Assignee: AXON LLC, Raleigh, NC (US)

( * ) Notice: Subject to any disclaimer, the term of this patent is extended or adjusted under 35 U.S.C. 154(b) by 230 days.

(21) Appl. No.: 15/815,882

(22) Filed: Nov. 17, 2017

(65) Prior Publication Data

US 2018/0141695 A1 May 24, 2018

Related U.S. Application Data

(60) Provisional application No. 62/424,595, filed on Nov. 21, 2016.

(51) Int. Cl.
B65C 3/06 (2006.01)
B29C 53/20 (2006.01)
B65C 3/24 (2006.01)
B65C 9/00 (2006.01)
B29C 63/42 (2006.01)
B29L 31/00 (2006.01)
B29L 23/00 (2006.01)

(52) U.S. Cl.
CPC ............ B65C 3/065 (2013.01); B29C 63/426 (2013.01); B65C 3/24 (2013.01); B65C 9/0065 (2013.01); B29C 53/20 (2013.01); B29C 2793/0081 (2013.01); B29L 2023/001 (2013.01); B29L 2031/744 (2013.01)

(58) Field of Classification Search
CPC ........... B65C 3/065; B65C 3/24; B29C 53/20; B29C 9/0065; B29C 31/00; B32B 31/00; B65B 9/13; B65B 9/14; B65B 21/24

USPC ...... 53/64, 291, 292, 295, 298, 585; 156/64, 156/86, 510, 556
See application file for complete search history.

(56) References Cited

U.S. PATENT DOCUMENTS

| 3,799,834 | A | | 3/1974 | Horvath | |
|---|---|---|---|---|---|
| 3,802,152 | A | | 4/1974 | Strub | |
| 3,841,940 | A | | 10/1974 | Rubinich | |
| 3,861,118 | A | | 1/1975 | Muto | |
| 3,888,067 | A | * | 6/1975 | Cross | B67B 5/036 53/292 |
| 3,910,013 | A | | 10/1975 | Babineau | |
| 3,974,628 | A | * | 8/1976 | Konstantin | B29C 63/423 53/291 |

(Continued)

Primary Examiner — Hemant Desai
Assistant Examiner — Jacob A Smith
(74) Attorney, Agent, or Firm — Thompson Hine L.L.P.

(57) ABSTRACT

An apparatus for applying a tubular band from a supply of flat tubular material to a container includes a flat film feed path and a cutter positioned for cutting tubular material traveling along the feed path. A former is positioned downstream of the cutter for opening the tubular material and includes a film passage with an inlet side and an outlet side. The flat film feed path enters the film passage and a cut segment of tubular material is opened within the film passage to create an opened tubular band. A pusher pushes the opened tubular band out of the outlet side of the former for container application. The pusher includes a film engaging portion that is aligned with and movable into and out of the film passage. The film engaging portion is offset from the flat film feed path to prevent interference with flat tubular film entering the passage.

17 Claims, 4 Drawing Sheets

(56) References Cited

U.S. PATENT DOCUMENTS

| | | | |
|---|---|---|---|
| 4,102,728 A * | 7/1978 | Smith | B65C 3/065 |
| | | | 156/362 |
| 4,179,863 A | 12/1979 | Fresnel | |
| 4,208,857 A | 6/1980 | Fujio | |
| 4,387,553 A | 6/1983 | Strub | |
| 4,388,797 A | 6/1983 | Shields | |
| 4,497,156 A * | 2/1985 | Scheidegger | B67B 5/036 |
| | | | 53/293 |
| 4,545,181 A | 10/1985 | Frankfort | |
| 4,765,121 A * | 8/1988 | Konstantin | B65B 9/13 |
| | | | 53/442 |
| 4,806,187 A * | 2/1989 | Fujisawa | B65B 9/14 |
| | | | 156/521 |
| 4,914,893 A | 4/1990 | Strub | |
| 5,006,196 A | 4/1991 | Vandevoorde | |
| 5,024,049 A * | 6/1991 | Strub | B65C 3/065 |
| | | | 53/291 |
| 5,060,367 A | 10/1991 | Vandevoorde | |
| 5,086,682 A | 2/1992 | Strub | |
| 5,305,578 A * | 4/1994 | Menayan | B65B 9/13 |
| | | | 53/292 |
| 5,433,057 A | 7/1995 | Lerner | |
| 5,466,210 A * | 11/1995 | Wilcox | B65B 9/14 |
| | | | 493/309 |
| 5,483,783 A | 1/1996 | Lerner | |
| 5,495,704 A | 3/1996 | Menayan | |
| 5,711,135 A | 1/1998 | Menayan | |
| 5,715,651 A | 2/1998 | Thebault | |
| 5,737,900 A * | 4/1998 | Konstantin | B67B 5/03 |
| | | | 53/295 |
| 5,759,337 A | 6/1998 | Fujio | |
| 6,263,940 B1 | 7/2001 | Menayan | |
| 6,474,390 B1 | 11/2002 | Vandevoorde | |
| 6,523,331 B1 | 2/2003 | Fresnel | |
| 6,543,514 B2 | 4/2003 | Menayan | |
| 6,684,599 B1 * | 2/2004 | Fresnel | B65B 9/14 |
| | | | 53/585 |
| 6,966,164 B2 | 11/2005 | Navarro | |
| 6,996,954 B1 | 2/2006 | Farley | |
| 2001/0049924 A1 * | 12/2001 | Dauder Guardiola | B65B 9/13 |
| | | | 53/567 |
| 2005/0072510 A1 * | 4/2005 | Navarro | B29C 63/423 |
| | | | 156/64 |
| 2006/0237115 A1 * | 10/2006 | Houatchanthara | B29C 63/423 |
| | | | 156/64 |
| 2013/0000263 A1 * | 1/2013 | Ushidate | B65C 3/065 |
| | | | 53/585 |
| 2013/0118136 A1 * | 5/2013 | Arima | B65C 3/065 |
| | | | 53/585 |
| 2015/0210416 A1 * | 7/2015 | Duncan | B65C 3/065 |
| | | | 53/585 |

* cited by examiner

TUBULAR BANDING APPLICATOR AND METHOD

RELATED APPLICATIONS

This application claims priority to U.S. Provisional Application No. 62/424,595 filed Nov. 21, 2016, which is incorporated herein it its entirety.

TECHNICAL FIELD

This application relates generally to application of tubular labels to containers and, more specifically, to a labeling apparatus with a label pusher arrangement that is offset from a flat film feed path.

BACKGROUND

Tubular labels or bands can be supplied in cut lengths and fed from a magazine to the application machine, or supplied in continuous length on a roll, in which case the tubular supply is cut into pieces of a desired length in the applying machine. Tubular labels and bands are typically formed of polyvinyl chloride (PVC) or polyethylene (PE) resin. The process of applying a tubular label or band from a supply roll to a container involves the steps of drawing a length of tubular material from the supply, cutting the length of tubular material from the supply, reconfiguring the tubular material from a flat to an open cross section and placing the open cross section tubular material over the container in the selected position. The material may be heat shrinkable, in which case the tube is placed loosely over the container and subsequently shrunk.

A machine for applying tubular bands to containers is described in U.S. Pat. No. 6,966,164 to Navarro. In a typical cycle of the Navarro type machine a container trips a sensor to start the cycle. A tooling block (or former) holds a previously cut and expanded tubular band that is held in the tooling block by a gate. The cycle trip causes the gate to be retracted and the film feeds so that the "next" advancing film segment entering the tooling block pushes the cut band out of the tooling block onto the passing container. The gate is extended and a knife cuts the film once film feed cycle is complete and a flow of air urges the cut band into an expanded cylindrical shape within the tooling block so that the system is "loaded" with an expanded cut band inside tooling block that is ready to be moved onto a container upon detection of the next container to run another cycle. This operation and arrangement of using the film feed to push the tubular band from the tooling block can lead to film jams causing the machine to completely crash.

U.S. Pat. No. 6,996,954 to Farley describes a machine in which a separate pusher is used to move the cut bands out of the tooling block onto the passing container. In a typical cycle, a container trips a sensor to start a cycle. A cylindrical plunger or pusher is extended into the tooling block to push a previously cut band out of the block onto a container. The plunger retracts out of tubular tooling block and the tooling block is moved to a "home position" that is aligned with a flat film feed path. Flat film feeds into tube. A knife cuts the film once film feed cycle is complete and a flow of air urges the cut band into an expanded cylindrical shape within the tooling block so that the system is "loaded" with an expanded cut band inside tooling block that is ready to be moved onto a container. The loaded tubular tooling block is then moved to a "plunge ready" position that is offset from the flat film fee path and the system waits for the next container to trigger the cycle. This operation and arrangement, in which the tooling block shuttles back and forth, reduces jams, but is rather slow and limited in speed due to shuttling the tooling assembly between the home and plunge ready positions.

It would be desirable to provide tubular banding machine that has limited jams but at the same time is capable of more productive banding speeds.

SUMMARY

In one aspect, an apparatus for applying a tubular band from a supply of flat tubular material to a container includes a flat film feed path along which tubular material in flat condition travels and a cutter positioned for cutting tubular material traveling along the feed path. A former is positioned downstream of the cutter for opening the tubular material, the former having a film passage with an inlet side and an outlet side, wherein the flat film feed path enters the film passage and a cut segment of tubular material is opened within the film passage to create an opened tubular band. A pusher is provided for pushing the opened tubular band out of the outlet side of the former for application onto a container. The pusher includes a film engaging portion that is aligned with and movable into and out of the film passage, wherein the film engaging portion is offset from the flat film feed path so as to prevent interference with flat tubular film entering the film passage.

In another aspect, an apparatus for applying a tubular band from a supply of flat tubular material to a container includes a flat film feed path along which tubular material in flat condition travels. A former is positioned for opening the tubular material, the former having a film passage with an inlet side and an outlet side, wherein the flat film feed path enters the film passage and a cut segment of tubular material is opened within the film passage to create an opened tubular band. A pusher is provided for pushing the opened tubular band out of the outlet side of the former for application onto a container, wherein the pusher includes a film engaging portion that is aligned with and movable into the film passage but offset from the flat film feed path so as to not interfere with flat tubular film entering the film passage.

In a further aspect, an apparatus for producing tubular bands from a supply of flat tubular material includes a film feed path along which tubular material in flat condition travels, and a cutter positioned for cutting tubular material traveling along the feed path. A former is positioned for opening the tubular material, the former having a film passage with an inlet side and an outlet side, wherein the film feed path enters the film passage and a cut segment of tubular material is opened within the film passage to create an opened tubular band. A pusher is provided for pushing the opened tubular band out of the outlet side of the former, wherein the pusher includes a film engaging portion that is movable into and out of the film passage while the film passage remains in alignment with the film feed path, wherein the film engaging portion is offset from the film feed path so as to prevent interference with flat tubular film entering the film passage.

The details of one or more embodiments are set forth in the accompanying drawings and the description below. Other features, objects, and advantages will be apparent from the description and drawings, and from the claims.

DETAILED DESCRIPTION

Figure 1:
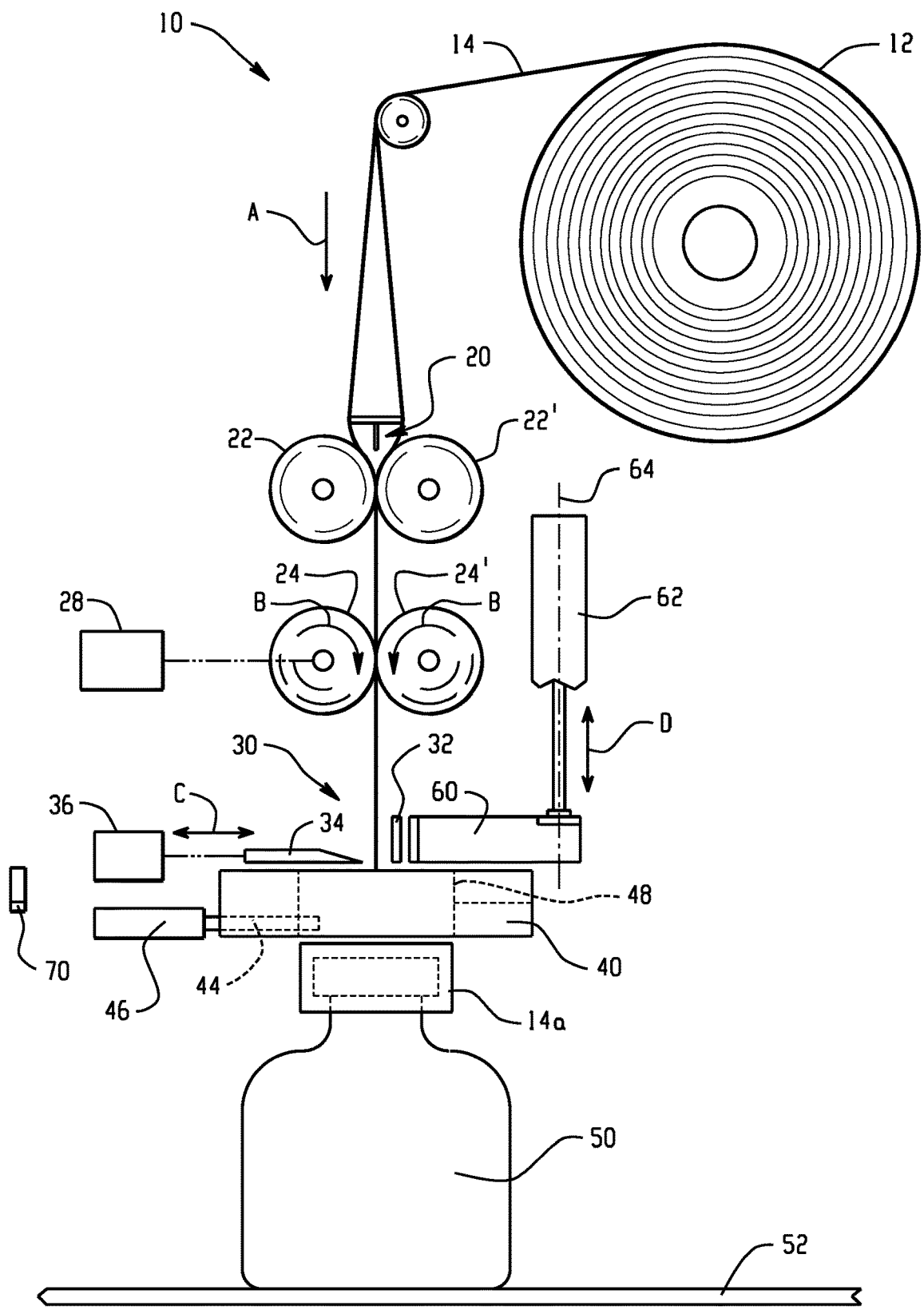
FIG. 1 shows a schematic depiction of one embodiment of a tubular banding machine.

The banding applicator apparatus 10 of the present invention is schematically illustrated in FIG. 1, and includes an arrangement for radially opening or expanding flattened tubular material to an expanded condition and placing a cut length of the opened tubular material circumferentially onto a container. The term "radially opening" or "expanding" as used in connection with flat tubular film indicates that the tube is expanded outwardly from a central axis of its flattened configuration to become two-dimensional in cross section, although not necessarily round; i.e. the opened tube may be shaped to match the cross section of the container on which the opened tube is to be mounted. Although the mounting of a relatively short band on the neck and closure portion of a container is primarily described below, it is recognized that the system is also applicable to longer bands used as labels to cover and decorate a major portion of a container's surface.

Referring now to FIG. 1, a quantity of flattened tubular banding material 14 is provided from a supply roll 12 that is rotatably mounted to enable tubular material 14 to be drawn through banding applicator 10 as needed. Tubular material 14 is drawn in the travel direction indicated by arrow A, passing over a spreader 20, between a pair of idler rollers 22, 22', and between a pair of drive rollers 24, 24'. Spreader 20 may be of the form described in U.S. Pat. No. 6,966,164 and is placed inside tubular material 14 and supported on idler rollers 22, 22' that are spaced from each other a distance sufficient to allow flattened tubular material 14 to pass therebetween and to maintain spreader 20 substantially in the position illustrated. Drive rollers 24, 24' are intermittently driven in the direction indicated by arrows B by any suitable driver 28, for example a stepper motor. In practice, only drive roller 24 is driven by driver and gearing between their respective shafts drives roller 24'. Alternatively, driver 28 may be another form of device, such as a motor and clutch combination, a linear motor, or a fluid-actuated cylinder.

The driver 28 is actuated to extend a portion of tubular material 14 from supply 12, and the driver is deactivated when a selected operator-preset length of tubular material 14 has been extended. The preset length may be determined by monitoring rotations of idler rollers 22, 22' or by an encoder connected to driver, or any other suitable means, such as a sensor, for example an optical detector, connected to be in communication with driver 28 and to cause driver 28 to stop in response to detecting a registration mark printed on tubular material 14.

Tubular material 14 next passes a cutter 30, which is downstream of the rollers 24, 24' in the travel direction A, and which cutter here includes a fixed blade 32, a moving blade 34, and a blade actuator 36, as shown. Moving blade 34 is driven into and out of engagement with fixed blade 32 in the cutting direction indicated by arrow C. Actuator 36 may, for example, be a pneumatically actuated cylinder. Other types of cutters 30 may be utilized, as is applicable to the banding material employed. A forward portion of tubular material 14 is inserted into the tooling block or former 40 that is mounted below cutter 30.

A gate 44 may be mounted horizontally at a level proximate the lower surface of former 40 or within a recess at the underside of the former so as to be horizontally moveable. Gate 44 may be extended and retracted by an actuator 46, which may be a fluid-operated cylinder or other form of linear motion driver. Alternatively, gate 44 may be configured to rotate in a horizontal plane to be placed into and out of the path of tubular material 14 by a controllable rotary device such as a servo motor. In other cases (e.g., where the tension of the expanded sleeve holds the sleeve in the former) the gate may be eliminated entirely.

Tubular material 14 is inserted into former 40, and after being cut at a selected length, cut band 14a opens radially for mounting onto a container 50 as container 50 is moved into position by a conveyor 52. Former 40 is described in detail below. When container 50 is in axial alignment below former 40, gate 44, when used, is retracted by actuator 46. Opened sleeve 14a is expelled from former 40 by the advancement of a pusher 60 that is movable by driver 62, which may be a fluid-operated cylinder or other form of linear actuator to drive the pusher 60 up and down, in and out of the former 40, in the direction indicated by arrow D. Notably, the pusher 60 is configured offset from the flat film feed path so as to prevent interference with flat tubular film entering the film passage 48 (shown in dashed line) of the former 40, and wherein the linear actuator 62 has a movement axis 64 that is completely offset from the film passage 48. Therefore, the former 40 can be maintained in a stationary position at all times during the typically banding cycle as generally described below (e.g., the former film passage remains aligned with the flat film feed path at all times during the banding cycle because the former 40 need not shuttle back and forth).

A container trips a sensor (e.g., 70) to start the cycle. The former 40 holds a previously cut and expanded tubular band that is supported in the passage 48 by gate 44. The cycle trip causes the gate 44 to be retracted and the actuator 62 extends to move the pusher 60 into the former and eject the tubular band from the tooling block onto the container 50 below. The actuator 62 retracts to a home position to move the pusher 60 out of the former 40 while the driver 28 is operated to feed a next segment of film into the former 40. Thus, the film feed overlaps with movement of the pusher, which overlap may be only on the retracting movement of the pusher. Alternatively, the film feed may also overlap the extension movement of the pusher 60 into the former. In either case, the configuration and orientation of the pusher prevents the pusher from interfering with the film feed into the film passage 48 of the former. So long as the pusher is retracted from the film passage 48 prior to expansion of the cut band within the former, no interference will occur. Once film feed has completed, the gate 44 is extended, the knife 30 cuts the film, and the system is loaded with another cut band inside of the film passage 48 of the former 40.

Figure 2:
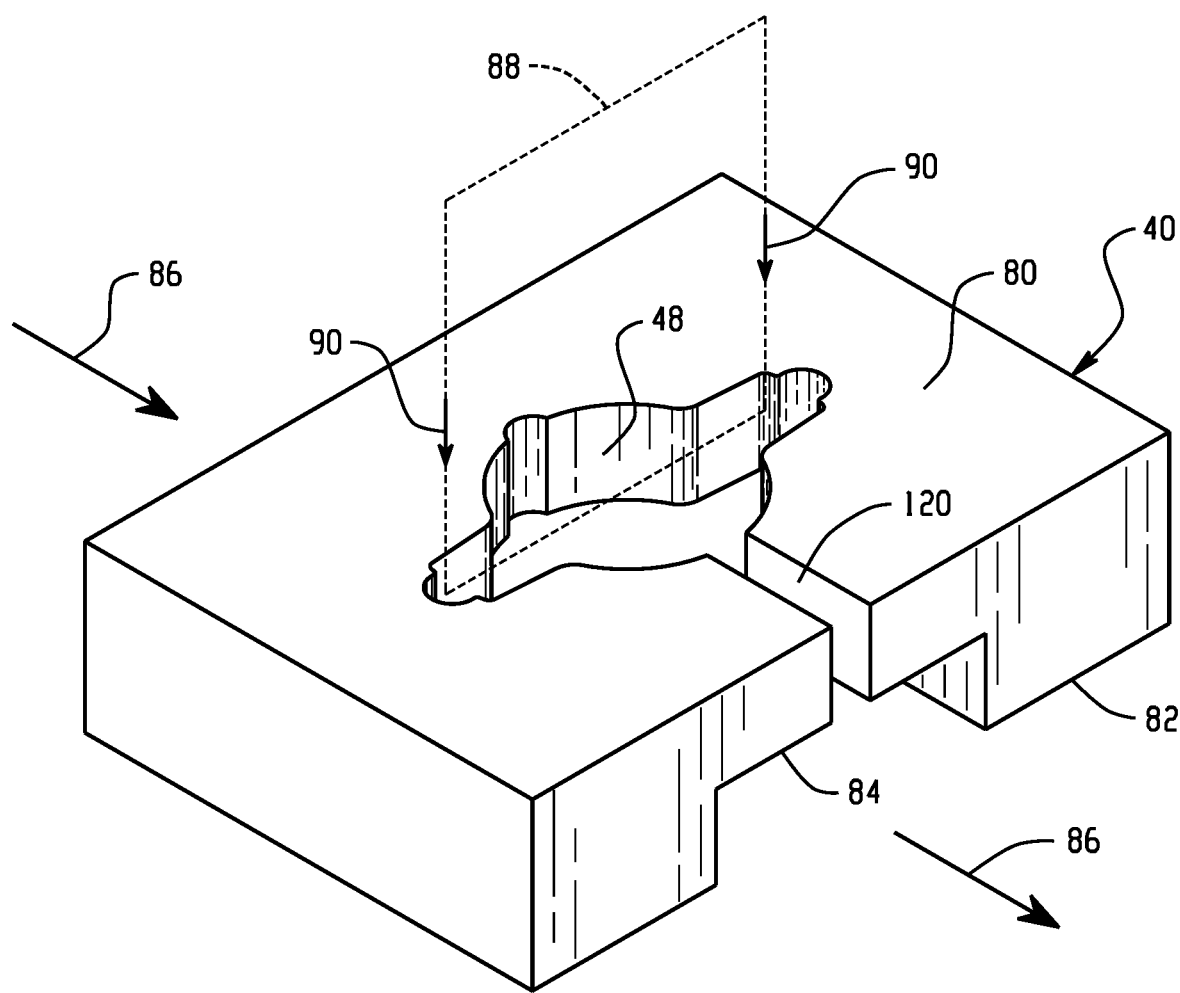
FIG. 2 shows a perspective view of one embodiment of a former useful in the banding machine.

FIG. 2 shows a perspective view of the former 40 with film passage 48 extending from top 80 to bottom 82 therethrough. Part of the bottom 82 is formed by an undercut 84 that allows for any portion of the band that extends upward from a container to move freely by the former 40, where the container conveying direction is depicted by arrows 86. The flat film feed path 88 into the film passage 48 is also depicted in dash line form with directional arrows 90.

Figure 3:
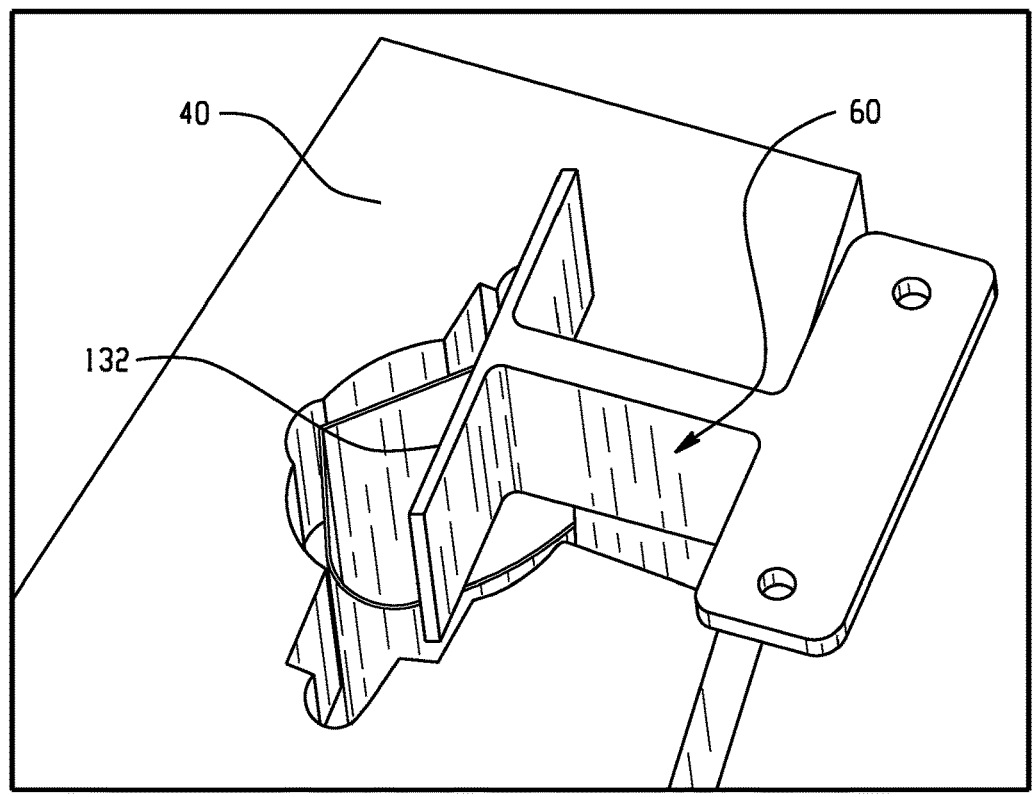
FIGS. 3 and 4 show perspective views of the former in combination with a pusher.
Figure 4:
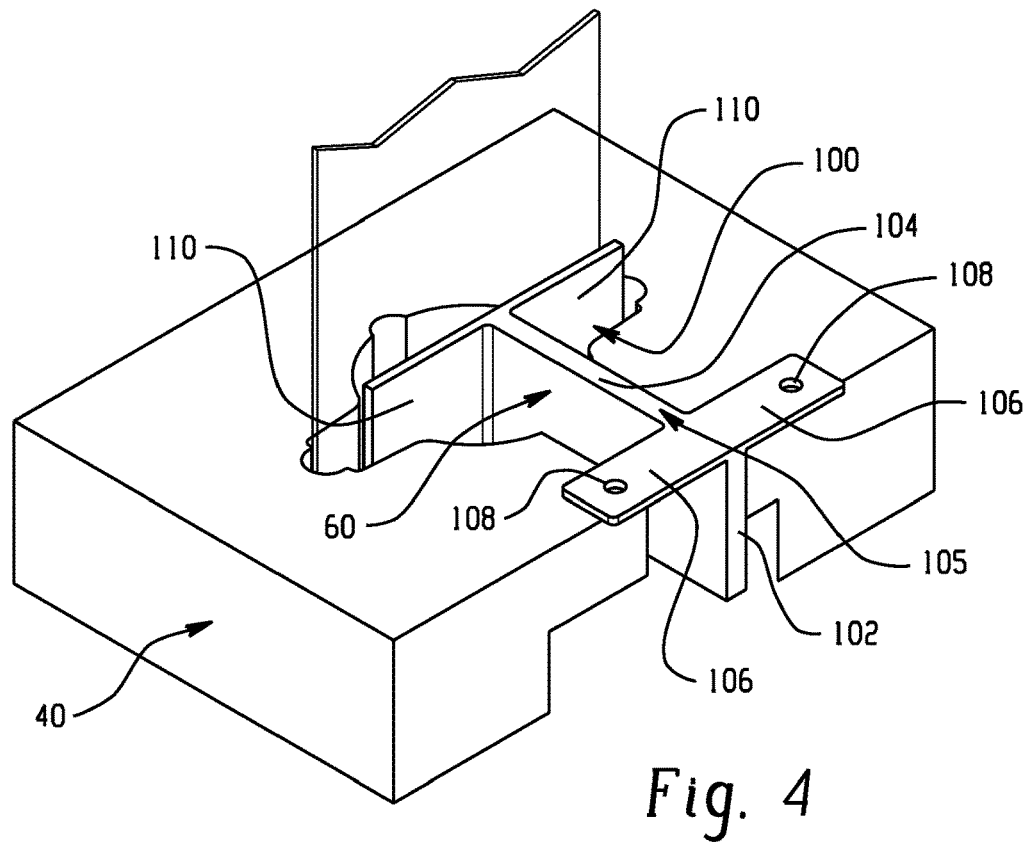

As seen in FIGS. 3 and 4, the illustrated pusher 60 is configured with a film engaging portion 100 configured with a T-shape to engage an upstream edge of an opened tubular band in the film passage at three spaced apart locations on the upstream edge. In particular, the pusher has a generally T-shaped end profile. A distal end 102 of the leg 104 of the T-shaped end profile defines a drive portion 105 of the pusher that is connectable to the linear actuator (e.g., via flanges 106 with openings 108). The film engaging portion is defined in part by distal ends of the opposed arms 110 of the T-shaped profile and in part by the initial segment of the leg 104. Thus, each arm 110 and a portion of the leg 104 moves into the film passage 48 of the former to engage and eject an expanded tubular band during the above-described sequence. However, the pusher drive portion (here formed by a free end of the leg 104) extends from the film engaging portion 100 beyond a perimeter of the film passage 48. Accordingly, the former 40 also includes a drive passage 120 (FIG. 2) that intersects the film passage 48 and receives the drive portion 105 of the pusher 60 as the film engaging portion of the pusher moves into the film passage.

Figure 5:
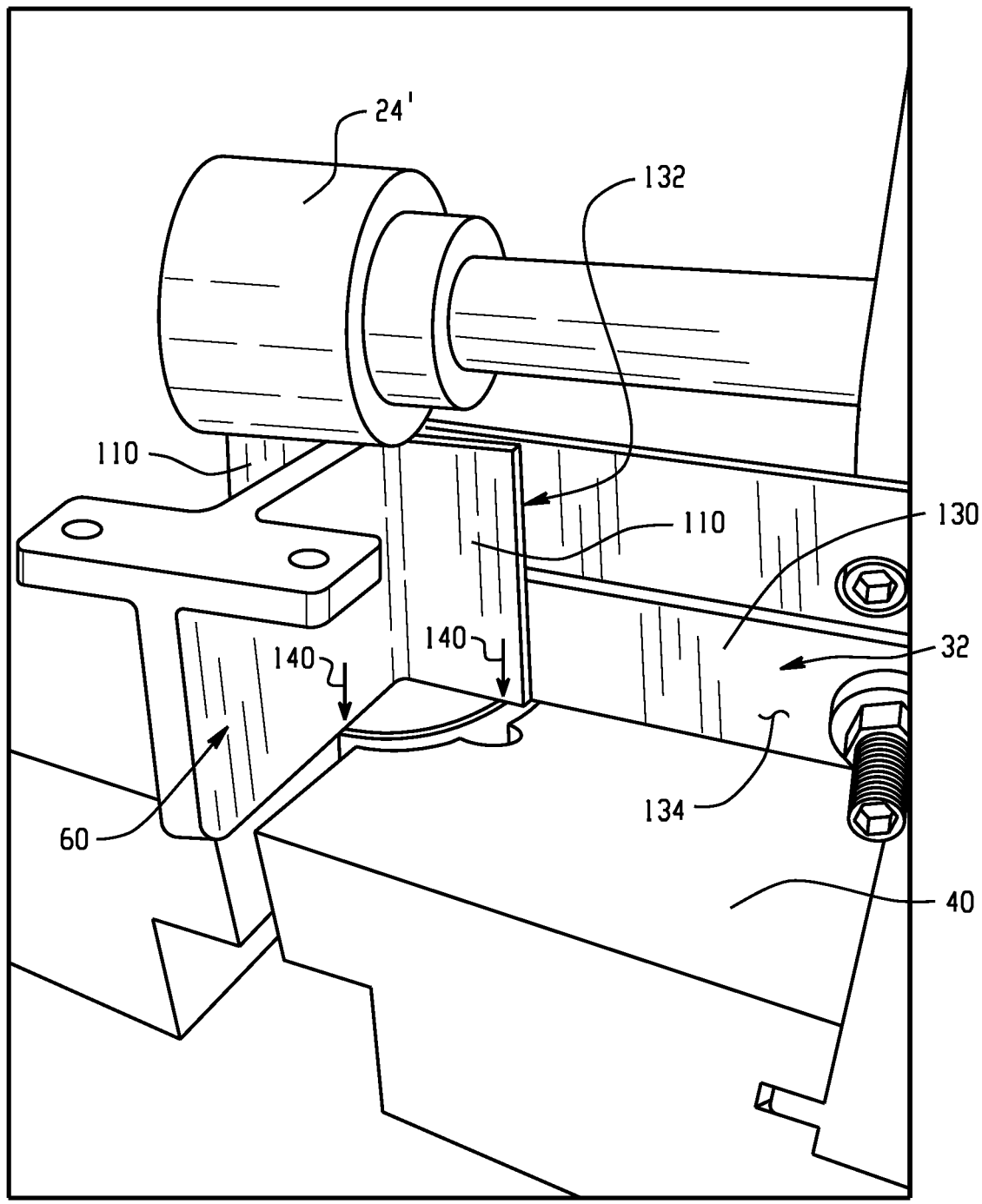
FIG. 5 shows a perspective view of a portion of the machine of FIG. 1 including the former, cutter and pusher.

As seen in FIGS. 1 and 5, the fixed blade 32 has a cutting side facing the flat film fee path and an opposite side 130 facing away from the flat film feed path. The pusher 60 is located proximate the opposite side 130 of the fixed blade 32. The arms 110 of the film engaging portion 110 define a planar surface 132 that faces the film feed path, and the opposite side 130 of the fixed blade 32 also defines a planar surface 134. In the illustrated embodiment, the planar surface 132 of the film engaging portion of the pusher is oriented parallel to the planar surface 134 of the fixed blade. By way of example, a spacing between the planar surface 132 and the planar surface 134 may be less than ½ inch, though other variations are possible. Likewise, pusher and cutter configurations that lack such proximate planar surfaces are also possible.

Two of the points of contact between an expanded tubular band and the film engaging portion of the pusher are depicted by arrows 140 in FIG. 5.

It is to be clearly understood that the above description is intended by way of illustration and example only, is not intended to be taken by way of limitation, and that other changes and modifications are possible. For example, while the use of a gate is described, the gate is not a necessary component for all implementations. Moreover, while a pusher with a T-shaped end profile is primarily described, other pusher end profiles/shapes are possible, as many end profiles/pusher shapes are possible that enable the pusher to have a film engaging portion that is aligned with and movable into the film passage but that is also offset from the flat film feed path so as to not interfere with flat tubular film entering the film passage. Accordingly, the pusher may be shaped to contact the upstream edge of the opened tubular band at just one location or at two or more spaced apart locations.

What is claimed is:

1. An apparatus for applying a tubular band from a supply of flat tubular material to a container, comprising:
    a flat film feed path along which tubular material in flat condition travels;
    a former positioned for opening the tubular material, the former having a film passage with an inlet side and an outlet side, wherein the flat film feed path enters the film passage and a cut segment of tubular material is opened within the film passage to create an opened tubular band; and
    a pusher for pushing the opened tubular band out of the outlet side of the former for application onto a container, wherein the pusher includes a film engaging portion that is aligned with and movable into the film passage but offset from the flat film feed path so as to not interfere with flat tubular film entering the film passage;
    wherein the film passage of the former remains aligned with the flat film feed path at all times during tubular band production and application;
    wherein the former remains stationary at all times during tubular band production and application.

2. The apparatus of claim 1 wherein the film engaging portion is configured to engage an upstream edge of the opened tubular band at at least one location on the upstream edge.

3. The apparatus of claim 1 wherein the pusher is movable by a linear actuator, and a movement axis of the linear actuator is offset from the film passage.

4. The apparatus of claim 3 wherein the pusher includes a drive portion extending from the film engaging portion beyond a perimeter of the film passage, the former includes a drive passage that intersects the film passage and receives the drive portion of the pusher as the film engaging portion of the pusher moves into the film passage.

5. The apparatus of claim 4 wherein the movement axis of the linear actuator is aligned with the drive passage.

6. The apparatus of claim 1 wherein the pusher includes a drive portion extending from the film engaging portion beyond a perimeter of the film passage, the former includes a drive passage that intersects the film passage and receives the drive portion of the pusher as the film engaging portion of the pusher moves into the film passage.

7. An apparatus for applying a tubular band from a supply of flat tubular material to a container, comprising:
    a flat film feed path along which tubular material in flat condition travels;
    a cutter positioned for cutting tubular material traveling along the feed path;
    a former positioned for opening the tubular material, the former having a film passage with an inlet side and an outlet side, wherein the flat film feed path enters the film passage and a cut segment of tubular material is opened within the film passage to create an opened tubular band; and
    a pusher for pushing the opened tubular band out of the outlet side of the former for application onto a container, wherein the pusher includes a film engaging portion that is aligned with and movable into and out of the film passage while the film passage of the former remains in alignment with the flat film feed path at all times during tubular band production and application, wherein the film engaging portion is offset from the flat film feed path so as to prevent interference with flat tubular film entering the film passage.

8. The apparatus of claim 7 wherein the pusher includes a drive portion extending from the film engaging portion beyond a perimeter of the film passage, the former includes a drive passage that intersects the film passage and receives the drive portion of the pusher as the film engaging portion of the pusher moves into the film passage.

9. The apparatus of claim 8 wherein the pusher is movable by a linear actuator, and a movement axis of the linear actuator is offset from the film passage.

10. The apparatus of claim 9 wherein the cutter includes a moving blade and a fixed blade, the fixed blade has a cutting side facing the flat film fee path and an opposite side facing away from the flat film feed path, the pusher is located proximate the opposite side of the fixed blade.

11. The apparatus of claim 10 wherein the film engaging portion defines a planar surface facing the film feed path, the opposite side of the fixed blade defines a planar surface, and the planar surface of the film engaging portion is oriented parallel to the planar surface of the fixed blade.

12. The apparatus of claim 11 wherein a spacing between the planar surface of the film engaging portion and the planar surface of the fixed blade is less than ½ inch.

13. The apparatus of claim 7 wherein the film engaging portion is configured to engage an upstream edge of the opened tubular band at one or more locations on the upstream edge.

14. An apparatus for producing tubular bands from a supply of flat tubular material, comprising:
 a film feed path along which tubular material in flat condition travels;
 a cutter positioned for cutting tubular material traveling along the feed path;
 a stationary former positioned for opening the tubular material, the stationary former having a film passage with an inlet side and an outlet side, wherein the film feed path enters the film passage and a cut segment of tubular material is opened within the film passage to create an opened tubular band; and
 a pusher for pushing the opened tubular band out of the outlet side of the stationary former, wherein the pusher includes a film engaging portion that is movable into and out of the film passage while the film passage of the stationary former remains in alignment with the film feed path at all times during tubular band production and application, wherein the film engaging portion is offset from the film feed path so as to prevent interference with flat tubular film entering the film passage.

15. The apparatus of claim 14 wherein the pusher is movable by a linear actuator, and a movement axis of the linear actuator is offset from the film passage.

16. The apparatus of claim 15 wherein the stationary former includes pusher drive passage that extends outwardly away from the film passage.

17. The apparatus of claim 16 wherein the pusher drive passage is open at an external side surface of the stationary former.

* * * * *